March 26, 1968 R. D. KELCH 3,375,458

WIDE-BAND AMPLIFIER

Filed March 30, 1964

INVENTOR,
RICHARD D. KELCH
BY Harry M. Saragovitz, Edward J. Kelly, Herbert Berl, & Julian C. Keppler
ATTORNEYS United States Patent Office 3,375,458
Patented Mar. 26, 1968

3,375,458
WIDE-BAND AMPLIFIER

Richard D. Kelch, Santa Clara, Calif., assignor to the United States of America as represented by the Secretary of the Army Filed Mar. 30, 1964, Ser. No. 355,983
4 Claims. (Cl. 330—43)

ABSTRACT OF THE DISCLOSURE

A multiplex-type amplifier system which is characterized by little or no degradation in performance at the cross-over points of the individual amplifiers within the amplifier system is provided. A wideband signal containing a plurality of octave signals is demultiplexed or separated into octave signals. Each of the octave signals is applied to a separate traveling wave tube octave amplifier. Each octave amplifier input signal, of course, has a particular phase angle. The output from each TWT amplifier is applied to a separate adjustable delay network. The time delay introduced by each delay circuit is of such an amount that the phase angle of the delay circuit output signal is the exact invert of the phase angle of the input signal to the TWT amplifier associated with that delay network. That is the phase angle of the output signal of a given delay circuit is exactly 360° minus the phase angle of the input signal to the TWT amplifier associated with that delay circuit. The outputs from the plurality of delay circuits are combined by a multiplexer. By maintaining the phase angle relationships as noted above there is little or no degradation of signals at the cross-over points of the TWT amplifiers.

The invention described herein may be manufactured and used by or for the Government of the United States of America for governmental purposes without the payment of any royalties thereon or therefor.

This invention relates to wide-band amplifiers and more particularly to multiple octave low-noise amplifier systems.

For purposes of this application the term "multiplexer" relates to the operational characteristic of combining two or more signals of different frequency bands into a single frequency bandwidth and the term "demultiplexer" relates to the operational characteristic of simultaneously decombining or simultaneously separating a single frequency bandwidth into two or more different frequency bands. Both terms are used in connection with frequency division multiplexing.

The use of a demultiplexer to separate a wide band of frequencies into two or more narrower bands is well known. In such systems, discrete amplifiers are provided for each band, or channel, of frequencies and discrete outputs are derived therefrom. It has been found that when the discrete outputs of such a system are utilized separately as multiple outputs, a 3 db reduction in signal level at cross-over frequencies occurs and the signal-to-noise ratio is accordingly reduced 3 db. Thus in such systems the noise figure is 3 db higher in the cross-over frequency region compared to its value outside the cross-over region. In addition, receiver systems employing such amplifiers have been limited to the octave bandwidths of available low-noise traveling-wave tubes or have had to resort to RF switching between several traveling-wave tubes covering adjacent frequency bands.

It is an object of the present invention to provide an amplifier system that provides continuous low-noise amplification over two or more octaves.

It is another object of the present invention to provide a multiplex-type amplifier system with single input and output terminals and with an instantaneous bandwidth that is up to three or more times as great as the bandwidth of previously available amplifiers.

It is still another object of the present invention to provide a multiplex-type amplifier system which is characterized by little or no degradation in performance at the cross-over points of the individual amplifiers within the amplifier system.

In accordance with the present invention, there is provided a wide-band amplifier for a signal frequency bandwidth having a plurality of adjacent octaves wherein amplification of signals within the cross-over region as well as signals outside the cross-over region is readily achieved without loss. It includes a demultiplexer for separately producing the discrete adjacent octave frequency signals comprising the input signal bandwidth and discrete amplifying means for respective octave frequency signals. Also included are discrete means for reversing the phase of the respective amplified octave signals relative to the input of associated octave signals to the amplifying means and a multiplexer for recombining the phase reversed signals to produce a single amplified output signal comprising the input frequency bandwidth. The multiplexed output is such that there is no loss of that part of the input signal amplified in adjacent octave bandwidth amplifiers.

For a better understanding of the invention, together with other and further objects thereof, reference is had to the following description taken in connection with the accompanying drawings in which.

Figure 1:
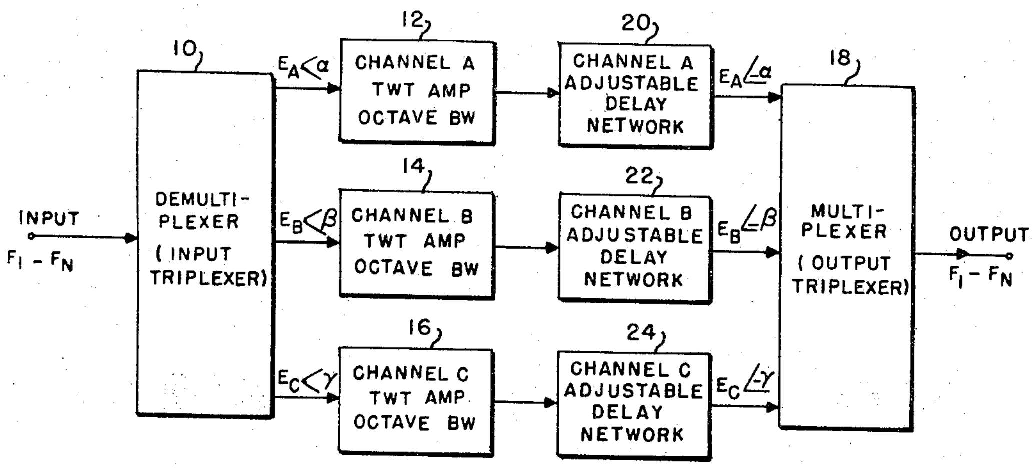
FIG. 1 is an illustrative block schematic diagram of the present invention.

FIG. 1 of the drawing illustrates the invention as applied to a three octave bandwidth amplifier system. It is to be understood of course that the three octave bandwidth is purely illustrative and the invention is not to be limited thereto.

Referring now to FIG. 1, the input signal range $F_1$–$F_n$ is separated into three octaves by input triplexer 10, hereinafter referred to as the demultiplexer. As an example, for an input of 1–8 gc. to demultiplexer 10, the octave channels will be as follows: channel A, 1–2 gc.; channel B, 2–4 gc.; and channel C, 4–8 gc. The three discrete octave frequency channels are applied to respective TWT amplifiers 12, 14 and 16, which may comprise conventional low-noise octave bandwidth traveling-wave tubes having similar operating characteristics. The amplified outputs from TWT amplifiers 12, 14 and 16 are applied as inputs to output triplexer 18, hereinafter referred to as the multiplexer, through respective adjustable delay networks 20, 22 and 24. Multiplexer 18 recombines the discrete amplified octave bandwidths to provide the same overall three octave bandwidth signal $F_1$–$F_n$ applied at the input to demultiplexer 10. Demultiplexer 10 and multiplexer 18 are identical passive reciprocal devices and have identical insertion loss characteristics. The net gain provided for each octave frequency is such that the relative amplitude of the signals in the three channels are the same at the input and output of the amplifiers 20–24. The respective adjustable delay networks 20, 22 and 24 are arranged such that the relative phase angle between respective octave bandwidth signals at the outputs of demultiplexer 10 must be inverted at the corresponding inputs of the output triplexer or multiplexer 18. For example, for a signal $E_A < \alpha$ at the output of demultiplexer 10, the input to multiplex 18 is $E_A < -\alpha$ for $E_B < \beta$ at the output of demultiplexer 10, the input to multiplexer 18 is $E_B < -\beta$; and for $E_C < \gamma$ at the output of demultiplexer 10, the input to multiplexer 18 is $E_C < -\gamma$. Thus the phase angle between the signals in the three octave channels is inverted at the input to multiplexer 18 with respect to its value at the output of demultiplexer 10. The system hereinabove described will provide the following conditions throughout the triplexer cross-over region in order to have octave signals recombine without loss:

(1) The net gain in channels A, B, C, are equal.

(2) The demultiplexer (input triplexer) and multiplexer (output triplexer) are identical passive reciprocal devices.

(3) The relative phase angle between signals at the outputs of the demultiplexer are inverted at inputs of the multiplexer.

Figure 2:
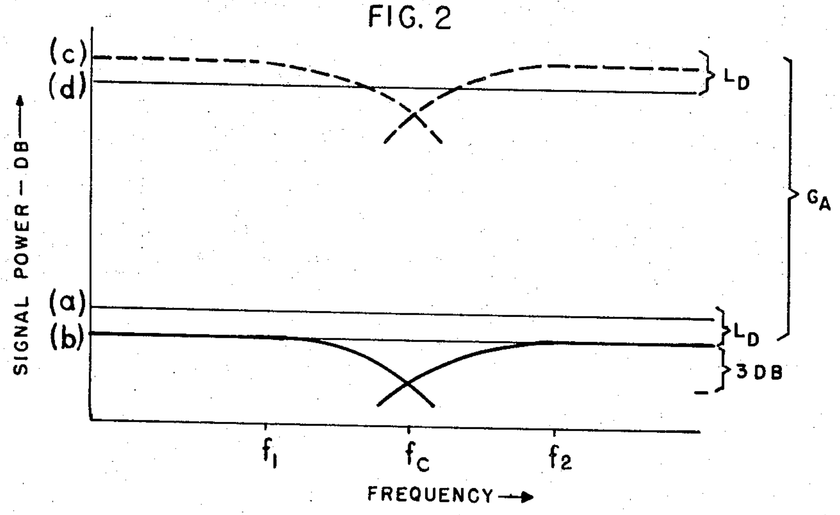
FIG. 2 is an explanatory curve.

When the above conditions are met, the combined amplifier output signal from multiplexer 18 is independent of frequency and may be expressed as $$S_o=S_i(L_D)^2G$$

where $S_o$=combined output signal from multiplexer 18
$S_i$=input signal to demultiplexer 10
$L_D$=normal insertion loss of 10 and 18
$G$=gain per channel The operation of the present invention can best be understood by the curve shown in FIG. 2 which, for simplification, is directed to a two channel system using diplexers and which meets the conditions above. The principle is the same regardless of the number of channels. The levels *a, b, c,* and *d* represent the respective signal powers of: (a) the input signal; (b) the input to the amplifier channels; (c) the output of the amplifier channels which is also the input to the multiplexer (output diplexer); and (d) the combined output from the multiplexer (output diplexer). The cross-over area is from $f_1$ to $f_2$ with the cross-over frequency shown at $f_c$. It can be seen that the signals at *d*, the combined output, are independent of frequency. It can be easily shown that when the two channels are not recombined or multiplexed under the above mentioned conditions, the noise figure is 3 db higher at $f_c$ compared to its value outside the cross-over region. For the particular case of low-noise traveling-wave tube amplifiers, it has been found that the electrical length of the lower frequency band tube of an adjacent frequency band pair is significantly longer, at a common frequency, than the electrical length of the higher frequency band tube. In addition, it has been found that difference in electrical length between such a pair, in the overlap or cross-over region, is very closely approximated by a non-dispersive length of transmission line. Thus in the system shown in FIG. 1 in which the amplifiers are low-noise TWT's, the adjustable delay network may consist of a predetermined length of transmission line and a non-dispersive phase shifting device such as a line stretcher. Of course, in order to obtain the correct phase relationship within the cross-over region between demultiplexer 10 and the multiplexer 18, the phase relationship between adjacent channels of the demultiplexer or input triplexer must be determined. Once this phase relationship has been determined, it must be stabilized and maintained by means well known in the art. For example, relative phase and gain stability of the TWT amplifiers is achieved by operating all amplifiers from a common high voltage power supply. Also, the transmission lines may comprise coaxial cables utilizing foamed polyethylene instead of the conventional solid dielectric cable. The foamed polyethylene type coaxial cables are less temperature sensitive and have the additional advantages of significantly lower attenuation.

While there has been described what is at present considered to be the preferred embodiment of this invention, it will be obvious to those skilled in the art that various changes and modifications may be made therein without departing from the invention, and it is therefore aimed in the appended claims to cover all such changes and modifications as fall within the true spirit and scope of the invention. For example, the system may also operate with other conventional tube type amplifiers at relative low frequencies or tunnel diodes and parametric amplifiers in the microwave region.

What is claimed is:

1. A wide-band amplifier system operative for a signal frequency bandwidth having three adjacent octaves, a demultiplexer for respectively separating the three octaves of said signal bandwidth, each of said separate octave signals have a separate and distinct phase angle; three separate octave signal amplifying means; means to apply one of said octave signals to each of said octave signal amplifying means, said octave signal amplifying means providing equal net gain for each of said octave signals; separate adjustable delay circuit means connected to the output of each of said octave signal amplifying means, said delay circuit means being so adjusted that the phase angle of the output signal from each of said delay circuit means is exactly 360° minus the phase angle of the input signal to the octave amplifier connected to that delay circuit means; a multiplexer for recombining said octave signals into a single output signal having a bandwidth equal to the bandwidth of the signal applied to said demultiplexer, the input of said multiplexer being connected to the outputs of all of said delay circuit means, the output of said multiplexer being characterized by the fact that there is no loss of that part of the signal amplified in adjacent octave amplifiers.

2. The system in accordance with claim 1 wherein said octave signal amplifiers each comprise a low-noise octave bandwidth traveling-wave tube amplifier and wherein said demultiplexer and said multiplexer are passive reciprocal devices having equal insertion losses.

3. A wide-band amplifier system for a signal frequency bandwidth having a plurality of adjacent octaves comprising: demultiplexer means for producing the discrete octave frequency signals comprising said bandwidth; a separate octave bandwidth traveling-wave tube amplifier for each of said octave signals, said octave signals each having a separate and distinct phase angle, said traveling-wave amplifiers being characterized by equal net gains; separate adjustable delay circuit means connected to the output of each of said traveling-wave amplifiers, each of said delay circuit means comprising a predetermined length of transmission line and a nondispersive phase shifter and being so adjusted that the phase angle of the output signal from each delay circuit means is exactly equal to 360° minus the phase angle of the input signal to the traveling-wave amplifier associated with that delay circuit means; and multiplexer means connected to the outputs of all of said phase delay means for recombining said discrete octave signals to produce a single amplified output signal having said frequency bandwidth, the single output signal being characterized by the fact that there is no loss of that part of the signal amplified in adjacent octave bandwidth amplifiers.

4. The system in accordance with claim 3 wherein the demultiplexer means and the multiplexer means are passive reciprocal devices characterized by the same insertion loss.

References Cited

UNITED STATES PATENTS

| | | | |
|---|---|---|---|
| 3,060,390 | 10/1962 | Brewer | 330—124 X |
| 3,102,167 | 8/1963 | Barton. | |
| 3,235,809 | 2/1966 | Alsberg et al. | 330—124 X |
| 3,263,179 | 7/1966 | Bosselaers et al. | 330—124 X |

ROY LAKE, *Primary Examiner.*

NATHAN KAUFMAN, *Examiner.*